(12) United States Patent
Busck et al.

(10) Patent No.: US 7,681,015 B2
(45) Date of Patent: Mar. 16, 2010

(54) GENERATING AND COMPARING MEMORY ACCESS RANGES FOR SPECULATIVE THROUGHPUT COMPUTING

(75) Inventors: Alexander Busck, Gothenburg (SE); Mikael Engbom, Gothenburg (SE); Per Stenstrom, Torslanda (SE); Fredrik Warg, Boras (SE)

(73) Assignee: Nema Labs AB, Gothenburg (SE)

( * ) Notice: Subject to any disclaimer, the term of this patent is extended or adjusted under 35 U.S.C. 154(b) by 29 days.

(21) Appl. No.: 12/022,713

(22) Filed: Jan. 30, 2008

(65) Prior Publication Data

US 2008/0184018 A1 Jul. 31, 2008

Related U.S. Application Data

(60) Provisional application No. 60/897,969, filed on Jan. 30, 2007.

(51) Int. Cl.
*G06F 9/38* (2006.01)
(52) U.S. Cl. .......................................... 712/216; 712/32
(58) Field of Classification Search .................. None
See application file for complete search history.

(56) References Cited

U.S. PATENT DOCUMENTS

| | | | | |
|---|---|---|---|---|
| 5,864,692 | A * | 1/1999 | Faraboschi et al. | 712/216 |
| 5,918,005 | A * | 6/1999 | Moreno et al. | 714/38 |
| 5,931,957 | A * | 8/1999 | Konigsburg et al. | 714/48 |
| 6,345,351 | B1 | 2/2002 | Holmberg | |
| 6,484,254 | B1 * | 11/2002 | Chowdhury et al. | 712/216 |
| 6,889,315 | B2 * | 5/2005 | Miyake et al. | 712/217 |
| 2004/0154012 | A1 * | 8/2004 | Wang et al. | 717/158 |
| 2006/0294326 | A1 | 12/2006 | Jacobson et al. | |
| 2008/0184011 | A1 | 7/2008 | Busck et al. | |
| 2008/0184012 | A1 | 7/2008 | Busck et al. | |

OTHER PUBLICATIONS

H. Akkary and M. Driscoll. A Dynamic Multithreading Processor. In Proc. of 31st IEEE Int. Symp. on Microarchitecture, pp. 226-236. Dec. 1998.
M. Chen and K. Olukotun. The Jrpm System for Dynamically Parallelizing Java Programs. in Proceedings of the 30th International Symposium on Computer Architecture, San Diego, CA, Jun. 2003.

(Continued)

*Primary Examiner*—Kenneth S Kim
(74) *Attorney, Agent, or Firm*—Fish & Richardson P.C.

(57) ABSTRACT

Systems, methods, and apparatuses including computer program products for speculative throughput computing are disclosed. Speculative throughput computing is used to execute program segments in parallel. In one aspect, a method includes generating precise ranges of locations that speculative read or write instructions have accessed; determining that a speculative write instruction from a first program segment has accessed a first precise range of locations; comparing the first precise range of locations with a second precise range of locations accessed by a speculative read or write instruction from a second program segment; determining that the first precise range of locations overlaps with the second precise range of locations; and identifying a miss-speculation and restoring memory content of locations speculative write instructions have accessed in the first precise range of locations and the second precise range of locations, when the first precise range of locations overlaps with the second precise range of locations.

31 Claims, 13 Drawing Sheets

OTHER PUBLICATIONS

J. Oplinger, D. Heine, S-W Liao, B. Nayfeh, M. Lam, and K. Olukotun. Software and Hardware for Exploiting Speculative Parallelism with a Multiprocessor, Tech. Report Computer Systems Laboratory, Stanford University, CSL-TR-97-715, Feb. 1997.

P. Rundberg and P. Stenstrom: An All-SoftwareThread-Level Data Dependence Speculation System for Multiprocessors, Journal of Instruction Level Parallelism, vol. 3. Oct. 2002.

] G. Steffan and T. Mowry. The Potential for Using Thread-Level Data Speculation to Facilitate Automatic Parallelization. In Proc. of Fourth Int. Symp. on High-Performance Computer Architecture, pp. 2-13, Feb. 1998.

Y. Zhang, L. Rauchwerger, and J. Torrellas. Hardware for Speculative Run-Time Parallelization in Distributed Shared-Memory Multiprocessors. In Proc. of Fourth Int. Symp. on High-Performance Computer Architecture, pp. 162-173, Feb. 1998.

F. Warg. Techniques to Reduce Thread-level Speculation Overhead. Ph. D. thesis, Department of Computer Science and Engineering, Chalmers, Jun. 2006.

Y. Zhang, L. Rauchwerger, and J. Torrellas Hardware for Speculative Parallelization in High-End Multiprocessors The Third PetaFlop Workshop (TPF-3), Feb. 1999.

Ceze, L. et al., "Bulk Disambiguation of Speculative Threads in Multiprocessors", Proceedings of the 33$^{rd}$ International Symposium on Computer Architecture, Boston, MA, USA, (Jun. 17-21, 2006), pp. 227-238.

Cintra, M. et al., "Toward Efficient and Robust Software Speculative Parallelization on Multiprocessors", Proceedings of the ACM SIGPLAN Symposium on Principles and Practice of Parallel Programming, San Diego, CA (Jun. 11-13, 2003), pp. 13-24.

Hammond, L. et al., "Data Speculation Support for a Chip Multiprocessor", ACM SIGPLAN Notices, Association for Computing Machinery, New York, NY, US, vol. 33, No. 11 (Nov. 1, 1998), pp. 58-69.

Li, X. et al., "Speculative Parallel Threading Architecture and Compilation", *IEEE*, Proceedings of the 2005 International Conference on Parallel Processing Workshops, Oslo, Norway (Jun. 14-17, 2005), Piscataway, NJ, USA, pp. 285-294.

Moore, K. et al., "LogTM: Log-based Transactional Memory", *IEEE*, High-Performance Computer Architecture, The 12$^{th}$ International Symposium, Austin, TX, (Feb. 11-15, 2006), pp. 258-269.

Nema Labs AB, Invitation to Pay Additional Fees and Partial International Search Result for the International Application No. PCT/EP2008/051098 dated May 13, 2008, 6 pages.

Nema Labs AB, International Search Report and the Written Opinion of the International Application No. PCT/EP2008/051098 dated Jul. 31, 2008, 23 pages.

Rauchwerger, L. et al., "The LRPD Test: Speculative Run-Time Parallelization of Loops with Privatization and Reduction Parallelization", IEEE Transactions on Parallel and Distributed Systems, IEEE Service Center, Los Alamitos, CA, USA, vol. 10, No. 2 (Feb. 1999), pp. 160-180.

European Examiner Sylvain Lelait, Communication pursuant to Article 94(3) EPC for European Application No. 08 708 413.3 dated Nov. 5, 2009, 7 pages.

* cited by examiner

900

|      | P1            | P2            | ...  | PN            | SUM           |
|------|---------------|---------------|------|---------------|---------------|
| PTR1 | MAX, MIN, W   | MAX, MIN, W   |      | MAX, MIN, W   | MAX, MIN, W   |
| PTR2 | MAX, MIN, W   | MAX, MIN, W   |      | MAX, MIN, W   | MAX, MIN, W   |
| PTRM | MAX, MIN, W   | MAX, MIN, W   |      | MAX, MIN, W   | MAX, MIN, W   |

FIG. 9

GENERATING AND COMPARING MEMORY ACCESS RANGES FOR SPECULATIVE THROUGHPUT COMPUTING

CROSS-REFERENCE TO RELATED APPLICATIONS

This application claims priority to U.S. Provisional Application Ser. No. 60/897,969, for "System, methods, and business ideas for speculative execution of program segments in multiprocessors," filed on Jan. 30, 2007, which provisional patent application is incorporated by reference herein in its entirety.

TECHNICAL FIELD

This subject matter generally relates to throughput computing.

BACKGROUND

A program (e.g., computer application) can be partitioned into a plurality of program segments. For example, a program can be partitioned into program segments $P_1, P_2, \ldots, P_N$, where N is a number of program segments. Conventional computing systems can execute the program segments one after another in an enumerated order. For example, a single processor computing system can execute $P_1$ before executing $P_2$, $P_2$ before executing $P_3$, and $P_{N-1}$ before executing $P_N$. Executing program segments in this order respects sequential semantics (e.g., a program segment with a higher enumeration order x reads from a memory location before a program segment with a lower enumeration order y writes to the memory location, where x>y).

For example, a first program segment can have an enumeration order i, and a second program segment can have an enumeration order j, where i<j. The first program segment and the second program segment can be executed in parallel without violating sequential semantics if the program segments do not access the same memory locations. Furthermore, sequential semantics is not violated if the first program segment does not write to a memory location after the second program segment reads from the memory location.

Multiprocessor, multicore, or multithreading computing systems can execute program segments in parallel (e.g., executing program segments at substantially the same time) on a plurality of processors, processor cores, or threads. Executing program segments in parallel that were not originally designed to execute in parallel can be referred to as "speculative execution."

Conventional compilers can partition a program into program segments by determining which program segments access the same memory locations. Due to limitations of conventional analysis methods, or because accessed memory locations are unknown at a time of compiling, many programs cannot be partitioned by conventional compilers to allow for parallel execution of the program segments.

For example, some conventional analysis methods execute write instructions of program segments at temporary memory locations. These conventional analysis methods create execution overhead associated with using the temporary memory locations (e.g., storing and moving data from the temporary memory locations). Other conventional analysis methods use centralized data structures to store original data of memory locations where write instructions of program segments write, so that the original data may be restored. Updating the centralized structure can cause excessive overhead, especially if the write log is implemented in software using a dedicated data structure. Furthermore, if a miss-speculation occurs (e.g., when a program segment with an enumeration order i has written to a location that a program segment with an enumeration order j has already read, where i<j), program segments with an enumeration order higher (e.g., greater) than j halt and redo their executions. Halting and redoing executions causes execution overhead that can make speculative execution inefficient.

Furthermore, typical hardware and software implementations of conventional analysis methods use complex mechanisms and are inefficient. For example, typical software implementations create execution overhead because they use extra instructions, and cause poor memory system performance by lowering the memory locality, which can result in cache misses.

Some implementations monitor fixed regions of memory (e.g., a fixed range of one or more consecutive memory locations) to track if the region has been modified. A region size that is too large can result in false determinations of violations of sequential semantics. For example, a program segment may be forced to halt and redo its execution if it accesses the same region as another program segment with a lower enumeration order, even if none of the program segments accesses the same location. Alternatively, a region size that is too small increases the overhead of monitoring read and write instructions.

In addition, conventional profiling methods (e.g., test executions of programs to determine properties of a program to predict gains from speculative execution of the programs) assume a single method for speculative execution. Methods for speculative execution are also referred to as "speculative methods" or "processes for speculative throughput computing." Furthermore, conventional dependence analyzers often are not able to determine whether the program segments may be executed in parallel.

SUMMARY

Systems, methods, and apparatuses including computer program products for speculative throughput computing are disclosed. Speculative throughput computing is used to execute program segments in parallel.

Particular embodiments of the subject matter described in this specification can be implemented to realize one or more of the following advantages. An advantage of speculative throughput computing is that it reduces execution overheads by using speculative read and write computer instructions.

An additional advantage of speculative throughput computing is that it reduces execution overhead related to commit operations by assuming that a speculation is valid, and by restoring content of speculatively modified memory locations using a decentralized scheme.

An additional advantage of speculative throughput computing is that it determines speculative parallelism by executing program segments out of sequential order.

An additional advantage of speculative throughput computing is that it increases the accuracy of determining violations of sequential semantics and reduces execution overhead by maintaining a precise range of locations that have been speculatively accessed.

An additional advantage of speculative throughput computing is that it increases speedup gains from speculative execution by selecting one of a plurality of speculative methods.

An additional advantage of speculative throughput computing is that by increasing speedup gains, speculative throughput computing lowers an operating frequency of a system and reduces energy consumption.

DESCRIPTION OF DRAWINGS

FIG. 9 illustrates structures for an example software implementation of the process for speculative throughput computing of FIG. 3.

DETAILED DESCRIPTION

Example Computing Systems

Figure 1:
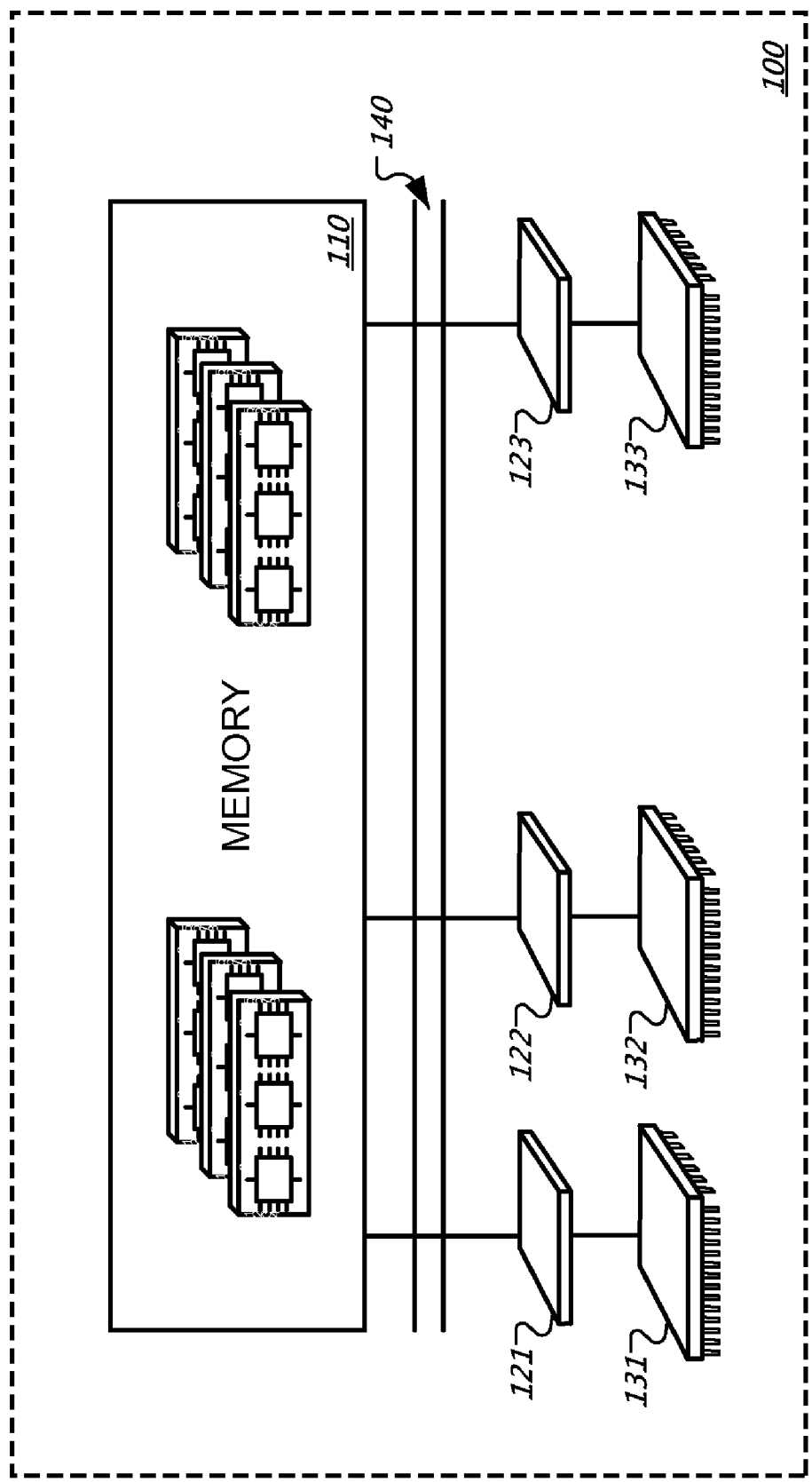
FIG. 1 illustrates an example multiprocessor computing system.

FIG. 1 illustrates an example multiprocessor computing system 100. The multiprocessor computing system 100 includes processors (e.g., processors 131, 132, and 133); cache memory coupled to the processors (e.g., private caches 121, 122, and 123); an interconnect 140; and a memory 110. The processors and the cache memory are coupled to the interconnect 140 (e.g., a bus, or a crossbar switch). The interconnect 140 allows cache memory to send a request for additional memory to memory 110 or other cache memory.

In some implementations, additional hierarchies of memory can be used in the multiprocessor computing system 100. For example, the memory 110 can be a secondary cache that is coupled to additional memory. In some implementations, the cache memory includes local memory that can be accessed by a processor coupled to the local memory. For example, a read or write instruction that is executed by the processor 131 can access local memory coupled to the processor 132 by invoking a software routine that sends a signal to the processor 132. The signal can invoke a software routine executed by the processor 132, where the processor 132 accesses the local memory and returns a value to the processor 131 by sending a signal to the processor 132.

Coherence (e.g., cache coherence) is maintained in the cache memory. In some implementations, a write-invalidate cache coherence mechanism can be used to maintain cache coherence. The write-invalidate cache coherence mechanism can invalidate a block of memory (e.g., contiguous locations of memory) in a cache memory when a processor coupled to another cache memory writes to the block of memory. In some implementations, a write-update cache coherence mechanism can be used to maintain cache coherence. In particular, a block of memory is updated when a processor coupled to another cache modifies the block of memory. In some implementations, a distribution protocol of invalidate and update requests can be one-to-all (e.g., snoopy cache protocols). In some implementations, the distribution protocol of invalidate and update requests can be one-to-one (e.g., directory-based protocols).

In some implementations, one or more of the processors can include a plurality of independent processor cores (e.g., a multi-core processor). For example, a dual-core processor includes two processors cores, and a quad-core processor includes four processor cores. The processor cores can execute a plurality of threads (e.g., program segments created by forks or splits of a program, or threads of execution) in parallel.

Program Translation Overview

Figure 2:
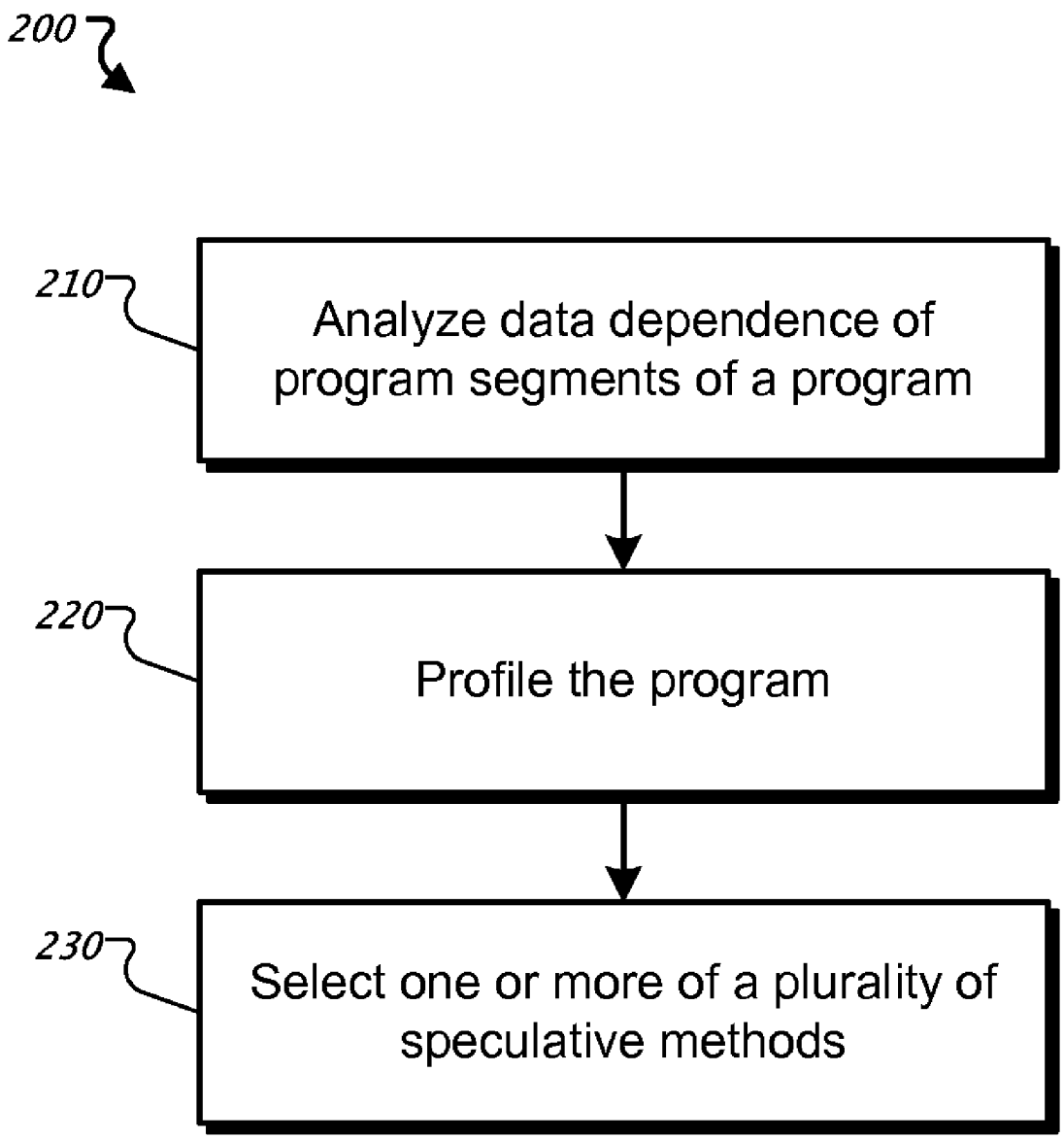
FIG. 2 shows an example process for translating a program to execute on a plurality of processors, processor cores, or threads.

FIG. 2 shows an example process 200 for translating a program to execute on a plurality of processors, processor cores, or threads. For example, a computer application written in a high-level programming language (e.g., C, C++, Fortran, or Java) can be translated into a machine language program that is executed on a processor. For convenience, the process 200 will be described with respect to a system that performs the process 200.

The system analyzes 210 data dependence of program segments of a program. In particular, the system determines whether program segments of the program, that can be sequentially executed (e.g., one after another) on a single processor computing system, can be executed in parallel (e.g., on a plurality of processors in a multiprocessor computing system, on a plurality of processor cores on a single processor, on a plurality of threads).

The system determines one or more methods to speculatively execute read and write instructions of program segments in parallel for use in the translation. In particular, the system profiles 220 the program. During a profiling pass, the system executes the program to collect statistics. Some examples of statistics include but are not limited to: a number of instructions executed in a program segment, an average number of cycles needed by each instruction, and a number of speculative reads and writes in a program segment. The system then selects 230 one or more speculative methods to use for translation. In some implementations, the system selects a combination of speculative methods.

Speculative Throughput Computing

Figure 3:
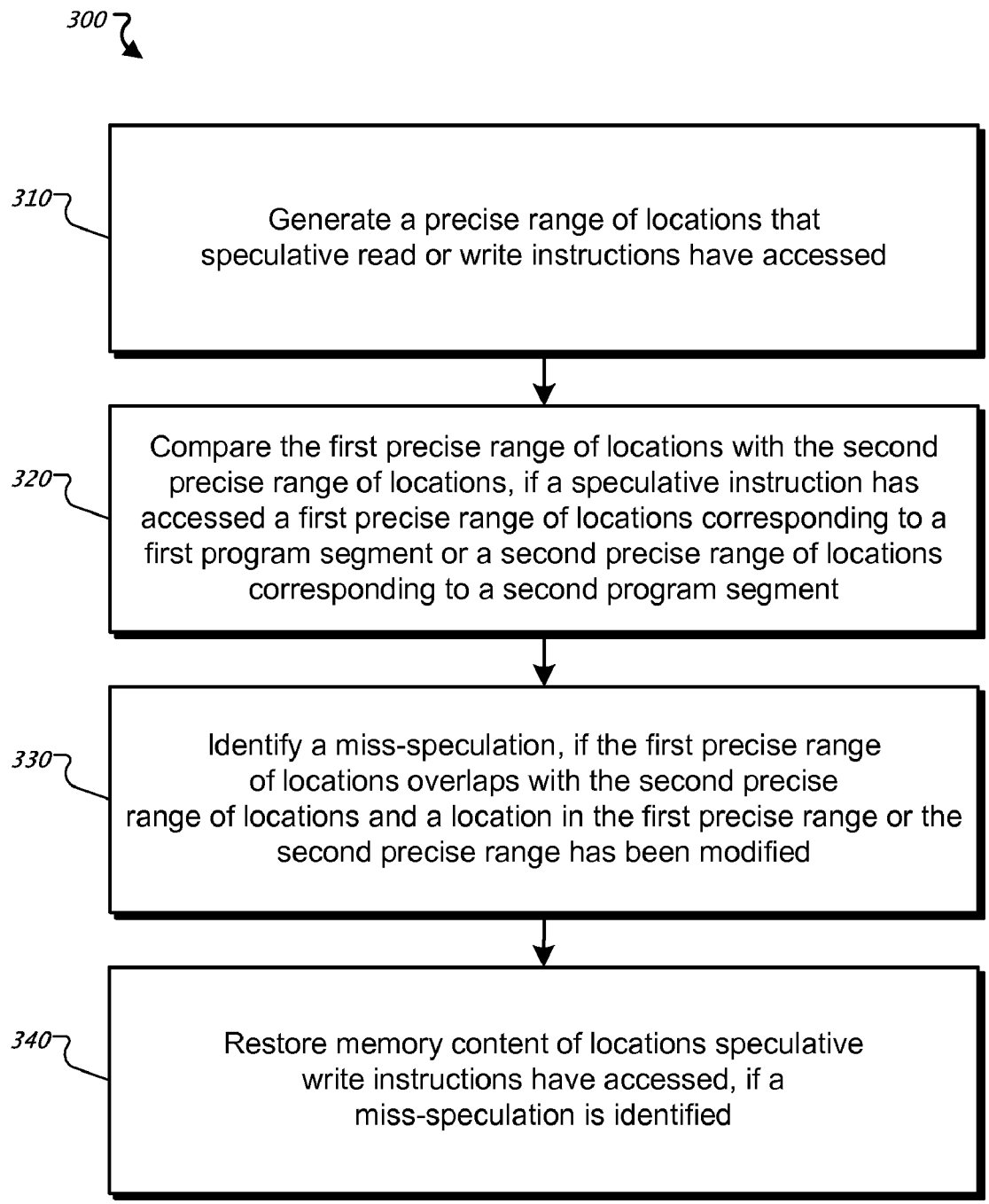
FIG. 3 shows an example process for speculative throughput computing.

FIG. 3 shows an example process 300 for speculative throughput computing. For convenience, the process 300 will be described with respect to a system that performs the process 300. In some implementations, the system generates 310 a precise range of locations that speculative read or write instructions have accessed. The range of locations can be precise because the highest location (e.g., a maximum data address in the range) has been accessed by a speculative read or write instruction. Furthermore, the lowest location (e.g., a minimum data address in the range) has been accessed by a speculative read or write instruction.

In some implementations, the system generates a precise range of locations that speculative read or write instructions have accessed for each processor in a multiprocessor, processor core in a multi-core processor, or thread. Other implementations are possible.

If a speculative write instruction has accessed a first precise range of locations corresponding to a first program segment or a second precise range of locations corresponding to a second program segment, the system can compare 320 the first precise range of locations with the second precise range of locations. In particular, the system can determine if a speculative execution of the program segments in parallel respects sequential semantics. For example, the first program segment and the second program segment can be executed in parallel. The first program segment can have an enumeration order less than an enumeration order of the second program segment. If the second program segment reads from a memory location before the first program segment writes to the memory location, then sequential semantics has been violated.

Sequential semantics can be violated if the ranges of locations overlap. For example, if the first precise range of locations overlaps with the second precise range of locations, then the first program segment and second program segment may have accessed the same memory location. If the first precise range of locations overlaps with the second precise range of locations and a location in the first precise range or the second precise range has been modified, the system identifies 330 a miss-speculation (e.g., a speculation that may not conform to sequential semantics).

If a miss-speculation is identified, the system restores 340 the memory content of locations speculative write instructions have accessed. Implementations of the process 300 for speculative throughput computing will be described in further detail with respect to FIGS. 4-13.

Example Hardware Implementation for Speculative Throughput Computing

Figure 4:
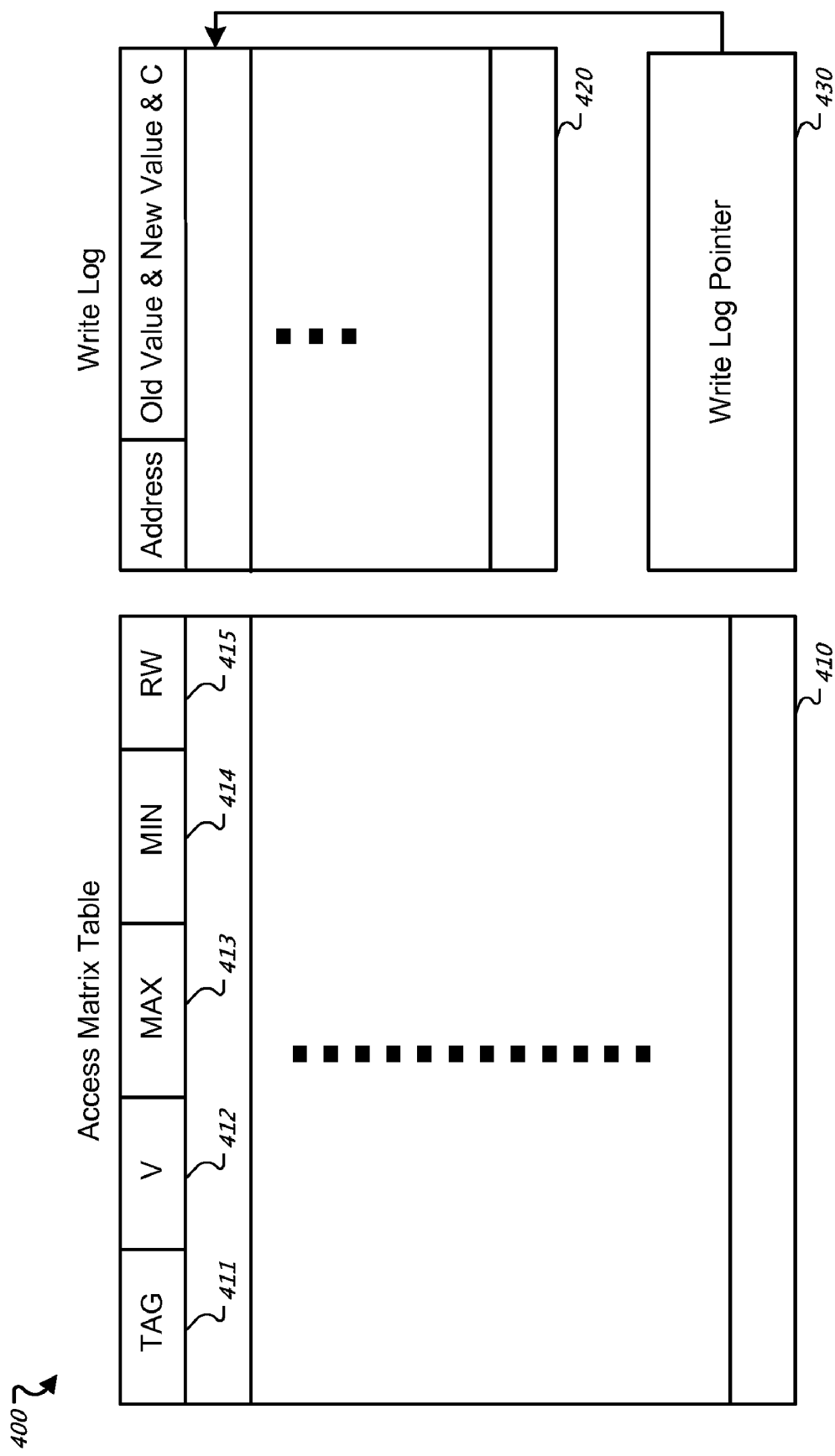
FIG. 4 illustrates structures for an example hardware implementation of the process for speculative throughput computing of FIG. 3.

FIG. 4 illustrates structures 400 for an example hardware implementation of the process for speculative throughput computing of FIG. 3. The structures, in hardware, include a data structure 410 (e.g., an access matrix table), a write log 420, and a write log pointer 430. In some implementations, each processor is extended with the structures (e.g., data structure 410, write log 420, and write log pointer 430). In some implementations, each processor core in a processor or thread is extended with the structures.

In some implementations, the data structure 410 is a table with a number of entries. Each entry can include fields. Some examples of fields include but are not limited to: an instruction address field 411, a data validity field 412, a maximum data address field 413, a minimum data address field 414, and an indicator field 415. The instruction address field 411 (e.g., "TAG" field) can store an instruction address (e.g., a 64-bit address that identifies a location of an instruction in memory). The data validity field 412 (e.g., "V" field) can store, for example, a single bit that indicates whether the data stored in an entry is valid. The maximum data address field 413 (e.g., "MAX" field) and the minimum data address field 414 (e.g., "MIN" field) can store data addresses. In particular, a maximum data address is stored in the maximum data address field 413 and a minimum data address is stored in the minimum data address field 414. The maximum data address field 413 and minimum data address field 414 can be used to define a precise range of locations, as described above with reference to FIG. 3. The indicator field 415 (e.g., "RW" field) can store an indicator (e.g., a single bit) to indicate whether the instruction corresponding to the entry is a read instruction or a write instruction.

In some implementations, the write log 420 can be a table with entries that can store addresses and data associated with write instructions. In some implementations, a register can be used to store the write log pointer 430. In particular, the register can store an index of a next free entry in the write log 420.

The data associated with the write instructions can include an old value (e.g., a value of a location before a write instruction is executed), a new value (e.g., a value a write instruction will write to the location), and one or more status bits. For example, if a write instruction is executed, a value (e.g., new value) is written to a memory location. The original value (e.g., value in the memory location before the write instruction was executed) is stored as the old value.

The size of the old values and new values (e.g., number of bits that are used to store the value) can be selected for different architectures. For example, a 32-bit architecture can include old values and new values that are 32-bit values. As another example, a 64-bit architecture can include old values and new values that are 64-bit values.

The status bits can indicate whether the data stored in the old value and new value is valid. The status bits can also be used when deriving the old value of one or more memory locations. The number of status bits can depend on the size of the values (e.g., old values, and new values). For example, each entry in the write log can include one status bit per addressable unit (e.g., a status bit for each 8-bit value, or byte). In some implementations, unused bits or bytes in a log entry are filled with placeholder bits or bytes. For example, placeholders bits or bytes can be the same bit or byte values used to fill the unused bits or bytes in both the old value and the new value.

Figure 5:
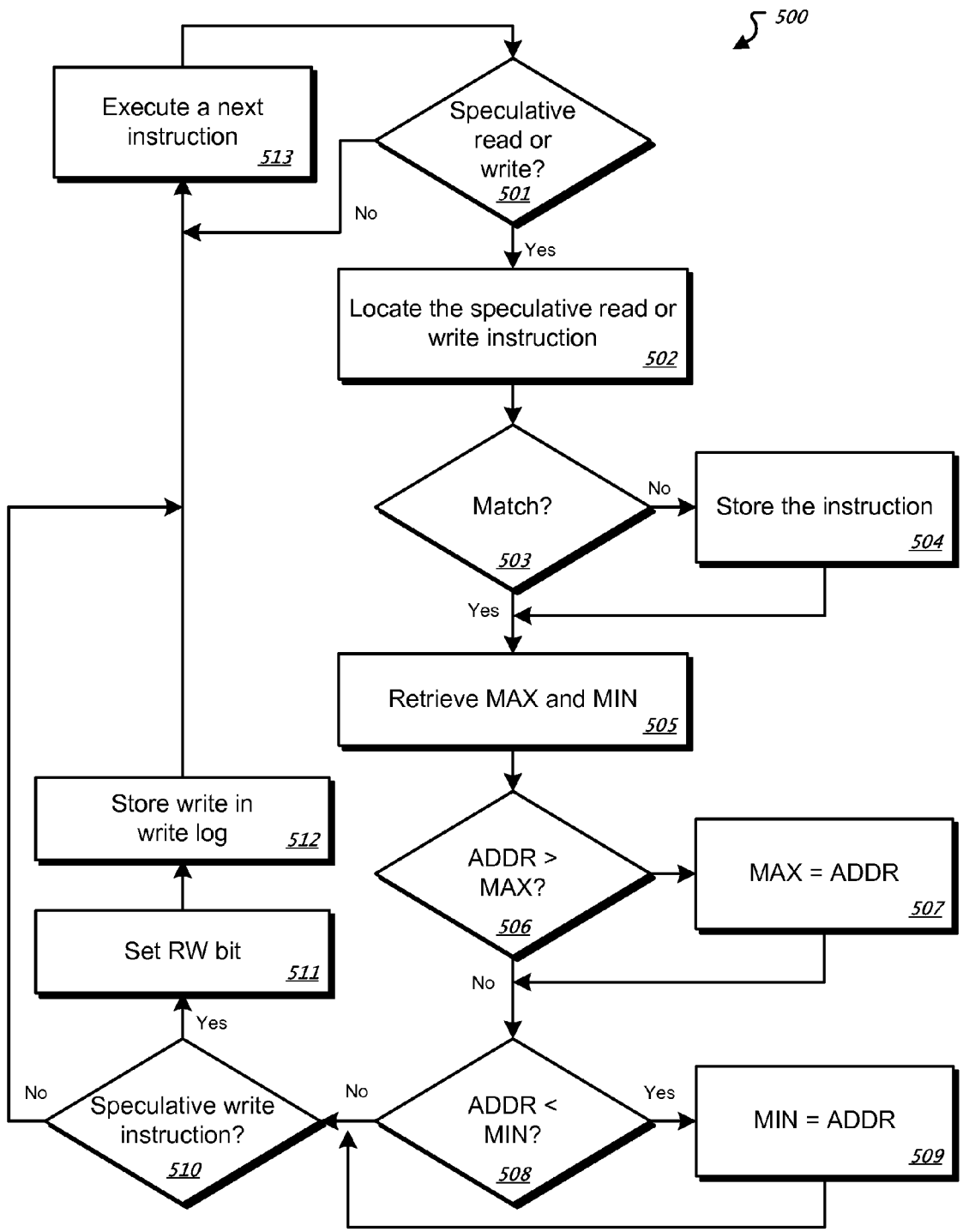
FIG. 5 shows an example process for generating the structures of FIG. 4.

FIG. 5 illustrates an example process 500 for generating the structures of FIG. 4. For convenience, the process 500 will be described with respect to a system that performs the process 500.

The system can distinguish between two types of memory instructions: regular read and write instructions (e.g., read and write instructions that are not speculative) and speculative read and write instructions. The system determines 501 if a read or write instruction is speculative. If the read or write instruction is not speculative ("No" branch of step 501), the read or write instruction is executed as usual (e.g., executed as a regular read or write instruction). Then, the system executes 513 a next instruction.

If the read or write instruction is speculative ("Yes" branch of step 501), a speculative read or write instruction is executed. The system locates 502 the speculative read or write instruction in the data structure (e.g., data structure 410 of FIG. 4) for a corresponding processor, processor core, or thread. In some implementations, the data structure can be a hash structure and can use address mapping methods, such as, for example, fully-associative, direct-mapped, or set-associative address mapping methods to locate instructions.

If the execution of the speculative read or write instruction is a first execution of the speculative read or write instruction (e.g., a match is not located in the data structure; "No" branch of step 503), then the system stores 504 the speculative read or write instruction. In particular, the system compares the instruction address of the speculative read or write instruction to the TAG fields of all of the entries in the data structure. If the execution of the speculative read or write instruction is a first execution of the speculative read or write instruction (e.g., the instruction address does not match any of the TAG fields), then the speculative read or write instruction is stored in the data structure. The system can allocate a new entry or use an entry that was evicted earlier.

If the execution of the speculative read or write instruction is not the first execution (e.g., a match is located in the data structure; "Yes" branch of step 503), the system compares an effective address of the speculative read or write instruction (e.g., a memory address that the speculative read or write instruction will access) with a maximum data address and a minimum data address. In particular, the system retrieves 505 values from the MAX field and MIN field in the data structure. If the effective address (e.g., ADDR of FIG. 5) is greater than the maximum data address ("Yes" branch of step 506), then the system stores 507 the effective address as the maximum data address. Otherwise ("No" branch of step 506), if the effective address is less than the minimum data address ("Yes" branch of step 508), then the system stores 509 the effective address as the minimum data address.

The system determines whether or not the speculative read or write instruction is a speculative write instruction. If the speculative read or write instruction is not a speculative write instruction ("No" branch of step 510), then the system performs step 513. If the speculative read or write instruction is a speculative write instruction ("Yes" branch of step 510), then the system sets 511 an indicator (e.g., a bit in the "RW" field) to identify a speculative write instruction. In addition, the system stores 512 the write, or the effective address and the data associated with the write instruction, in the write log (e.g., write log 420). In particular, the effective address and the data associated with the write log can be stored in a write log entry pointed to by the write log pointer (e.g., write log pointer 430 of FIG. 4), and the write log pointer is incremented to point to a next free write log entry (e.g., by incrementing the value in the register). Then, the system performs step 513.

Figure 6:
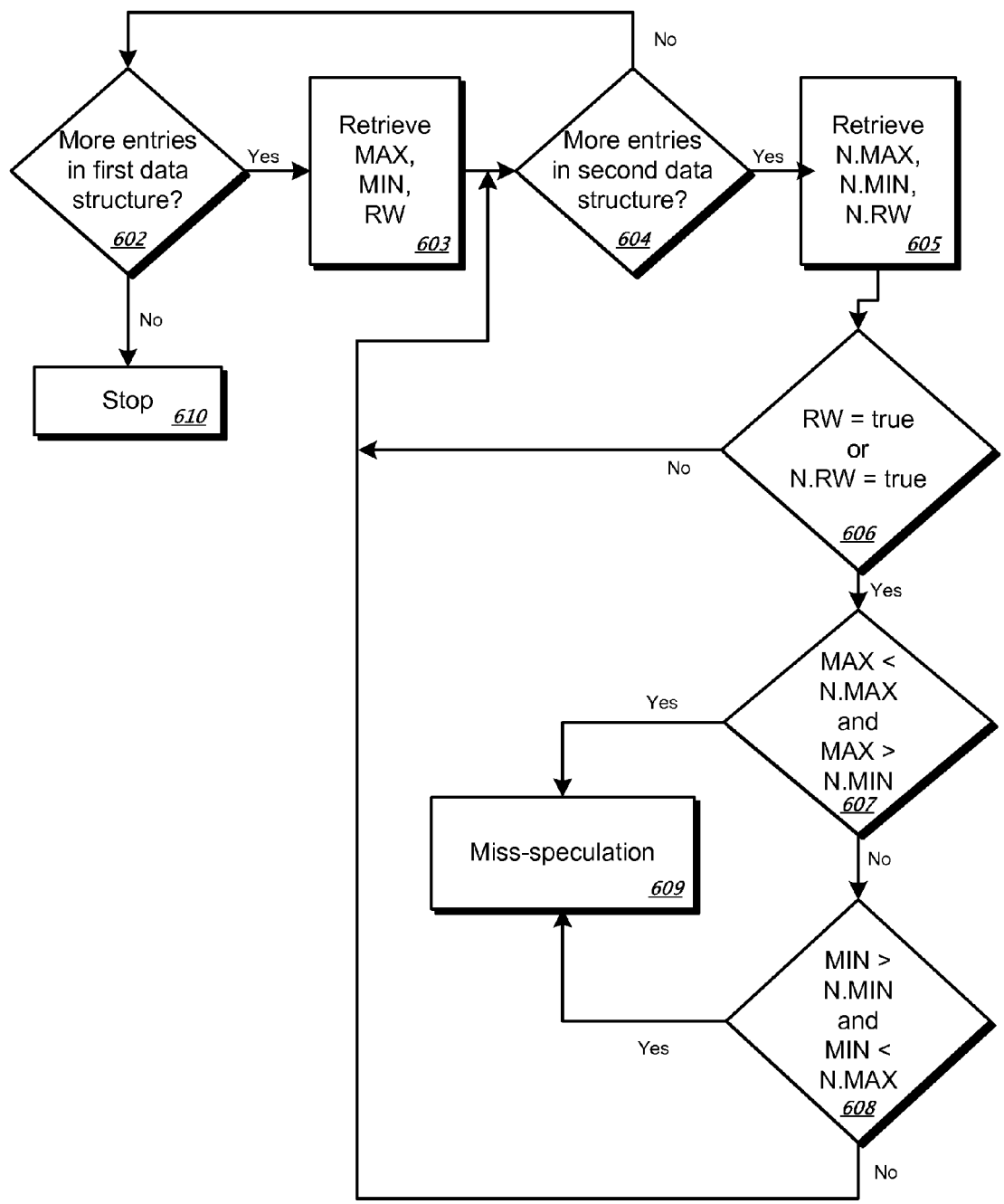
FIG. 6 shows an example process for a commit operation using the structures of FIG. 4.

Referring to FIG. 6, the system compares a first precise range of locations with a second precise range of locations to determine whether a range of locations accessed by one processor, processor core, or thread overlaps with the ranges of locations accessed by other processors, processor cores, or threads. The system determines if there are entries in a first data structure that have not been compared. If there are not more entries ("No" branch of step 602), then the system stops 610. If there are more entries ("Yes" branch of step 602), then the system retrieves 603 a maximum data address (e.g., MAX), a minimum data address (e.g., MIN), and an indicator (e.g., RW) from the data structure for a first processor, processor core, or thread.

In addition, the system determines if there are entries in a second data structure that have not been compared to the entry determined in step 602. If there are not more entries in the second data structure ("No" branch of step 604), the system returns to step 602. If there are more entries ("Yes" branch of step 604), the system retrieves 605 a maximum data address (e.g., N.MAX), a minimum data address (e.g., N.MIN), and an indicator (e.g., N.RW) in the data structure for a second processor, processor core, or thread. The system compares the maximum data address and the minimum data address from the first processor, processor core, or thread with the maximum data address and minimum data address from the second processor, processor core, or thread.

In particular, if the indicator in the data structure for the first processor, processor core, or thread is set, or the indicator in the data structure for a second processor, processor core, or thread is set ("Yes" branch of step 606); then a speculative write instruction has accessed the first precise range of locations corresponding to a first program segment, or the second precise range of locations corresponding to a second program segment, respectively. If the indicators are not set ("No" branch of step 606), then the system returns to step 604.

If the maximum data address from the first processor is less than the maximum data address from the second processor, processor core, or thread; and the maximum data address from the first processor is greater than the minimum data address from the second processor ("Yes" branch of step 607); then the first precise range of locations overlaps with the second precise range of locations, and the system identifies 609 a miss-speculation. Otherwise ("No" branch of step 607), the system performs step 608.

If the minimum data address from the first process is greater than the minimum data address from the second processor, processor core, or thread; and the minimum data address from the first processor is less than the maximum data address from the second processor ("Yes" branch of step 608); then the first precise range of locations overlaps with the second precise range of locations, and the system identifies 609 a miss-speculation. Otherwise ("No" branch of step 608), the system returns to step 604. The system compares each entry for a processor, processor core, or thread with each entry in all of the other processors, processor cores, or threads, in this manner.

Figure 7:
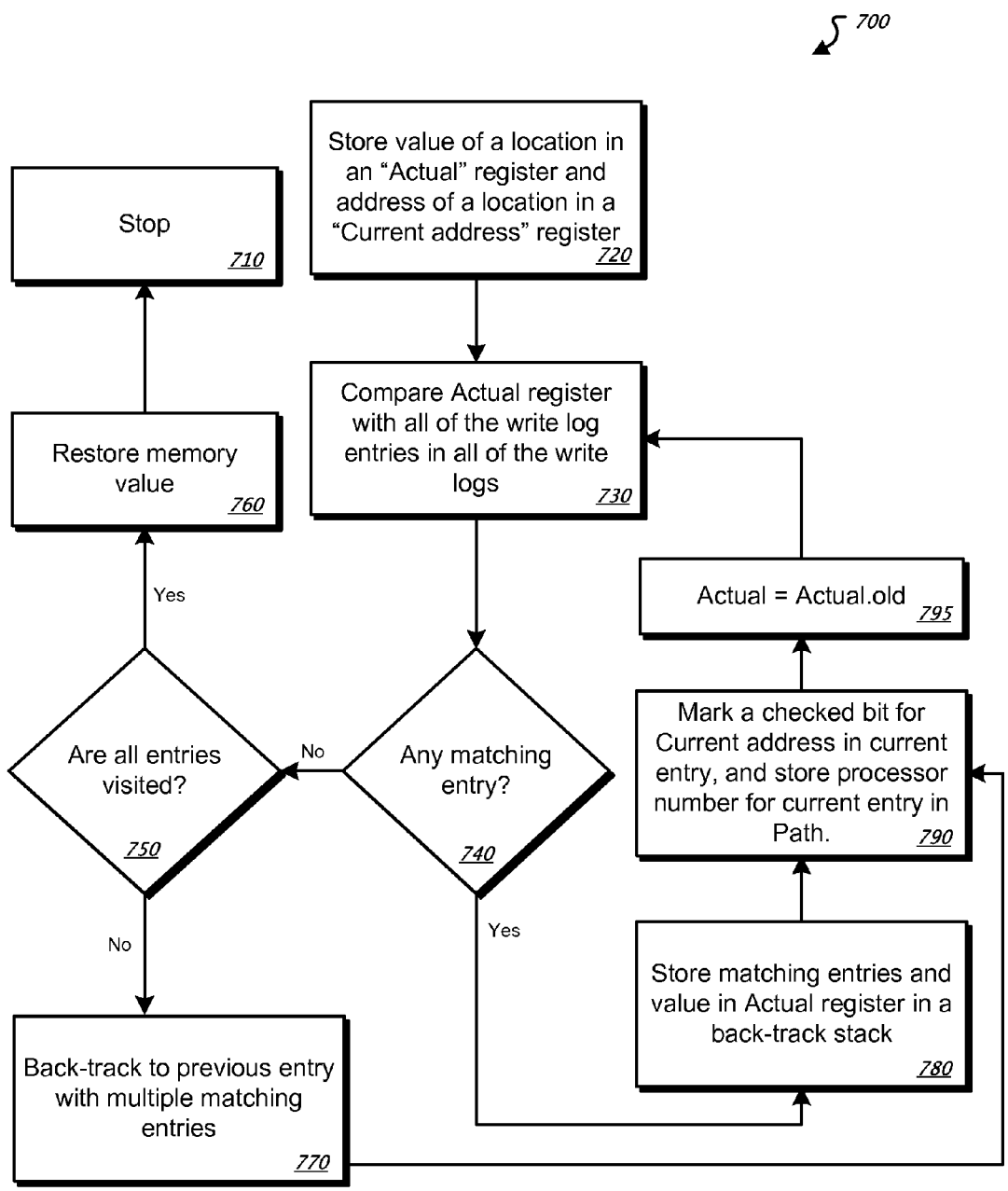
FIG. 7 shows an example process for a roll-back operation using the structures of FIG. 4 and a back-track stack.

If a miss-speculation is identified, the system restores memory content of locations speculative write instructions have accessed. FIG. 7 shows an example process 700 for a roll-back operation using the data structures of FIG. 4 and a back-track stack. In particular, FIG. 7 shows an example process for restoring memory content of a single location. The system can use the process 700 to restore memory content of all locations speculative write instructions have accessed. In some implementations, the process 700 is applied to one addressable unit (e.g., a byte) at a time. If the width of the values in the write log is larger than the addressable unit, the process 700 is applied for each addressable unit in the log entry (e.g., one unit at a time).

The system determines a processor, processor core, or thread that wrote a final value to a location in memory. The system stores a value of the location and an address of the location. For example, the system can store 720 the value of the location in an "Actual" register and the address of the location (e.g., current address) in a "Current address" register. The value in the Actual register is compared 730 with all of the write log entries in all of the write logs. If the current address is contained in a write log entry, a new value corresponding to the current address is equal to the value of the location (e.g., value in the Actual register), and the new value is not equal to a corresponding old value, then the system determines ("Yes" branch of step 740) a matching entry. The system stores the matching entry in a data structure to bookkeep the matching entries (e.g., back-track stack 800 of FIG. 8).

Figure 8:
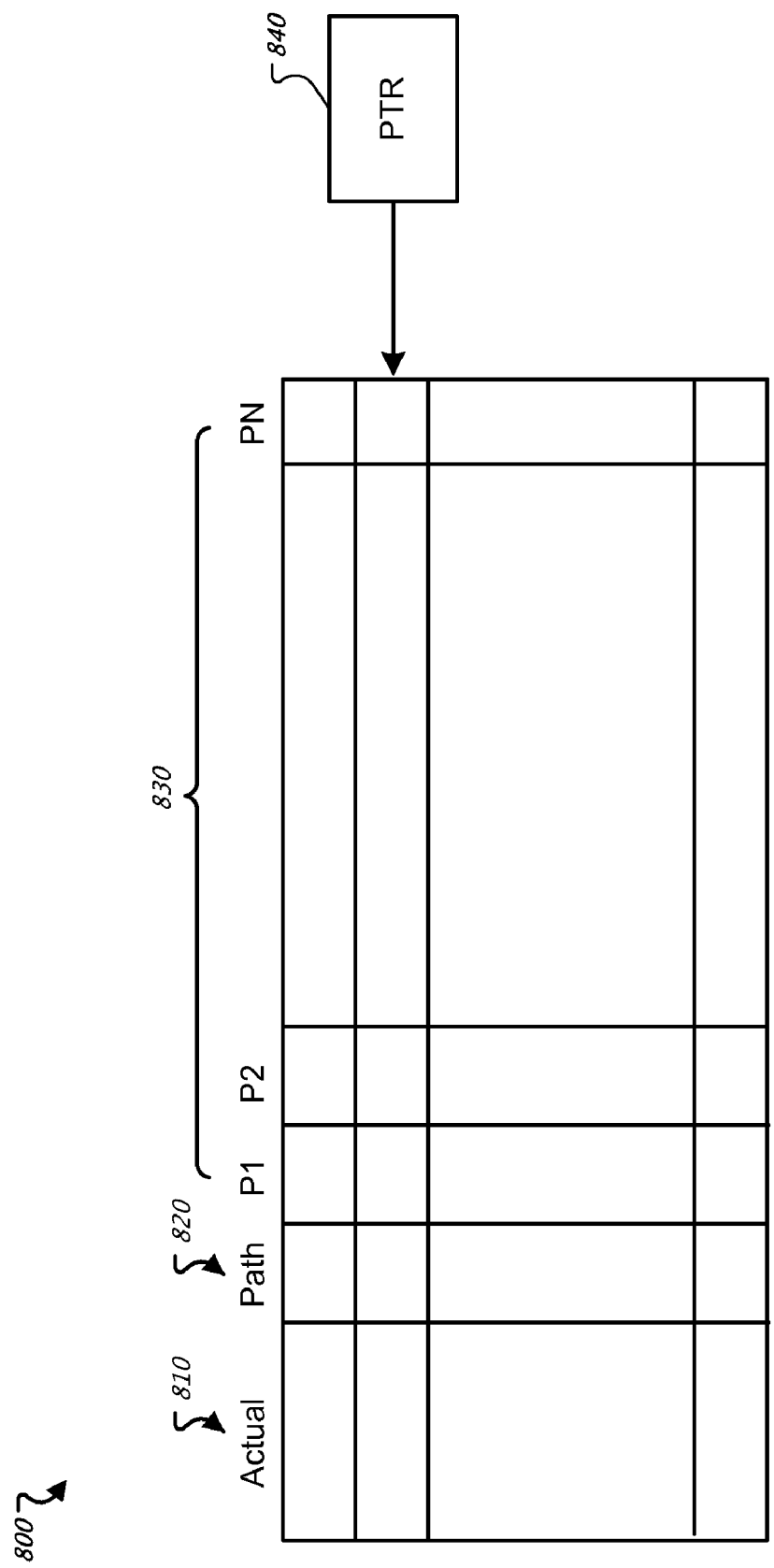
FIG. 8 illustrates an example back-track stack.

Referring to FIG. 8, the back-track stack 800 can include a number of entries. In some implementations, the number of entries can be less than or equal to a total number of entries in all of the write logs in the system. The back-track stack can be coupled to an interconnect (e.g., interconnect 140 of FIG. 1) and can be accessed by one or more processors, processor cores, or threads in the system. Also, each entry in the back-track stack 800 can include a current "Actual" field 810 and a "Path" field 820. The value in the Path field 820 can identify a particular processor, processor core, or thread. Each entry in the back-track stack can also include a number of fields 830 equal to the number of processors, processor cores, or threads. Each field can store an entry number that identifies the write log entry corresponding to the processor, processor core, or thread for the matching entries. In some implementations, the back-track stack can be a pointer structure. A pointer 840 keeps track of a next free entry in the back-track stack 800.

Returning to FIG. 7, matching entries are stored 780 in a back-track stack (e.g., back-track stack 800). The value in the Actual register is stored in the Actual field, and write log entry numbers for all matching entries are stored in a corresponding field of the processor, processor core, or thread of a matching entry.

An identifier of the particular processor, processor core, or thread (e.g., processor number one) is stored 790 in the Path field. The matching write log entry for the particular processor, processor core, or thread can be called the current entry. In some implementations, a checked bit for the current address in the current entry is marked 790.

The system determines a next value. The next value is an old value stored in the current entry in the write log (e.g., Actual.old). The next value is stored 795 in the Actual register. If there are matching entries remaining (e.g., the system determines another matching entry; "Yes" branch of step 740), the system returns to step 780.

If there is not another matching entry ("No" branch of step 740), the system determines if all entries have been checked. In particular, the system checks whether all write log entries containing the current address have the checked bit set, or if the old values and new values for the current address are equal. If all entries have been checked ("Yes" branch of step 750), then the system restores 760 a memory value and terminates 710. In particular, the system stores the Actual value in the location, thereby restoring the original value of the location.

If all entries have not been checked (e.g., determining that a write log entry containing the current address does not have a checked bit set, and the old values and new values for the current address are not equal; "No" branch of step 750), the system returns, or back-tracks, 770 to the previous entry in the back-track stack that included multiple matching entries (e.g., more than one of the processor, processor core, or thread fields are non-empty). The last entry used is pointed to by a pointer (e.g., pointer 840 of FIG. 8). The system clears the checked bit associated with the current address in the entry stored in the processor, processor core, or thread number field of the processor number in the Path field; the processor, processor core, or thread number field; and the Path field. If there is another non-empty processor number field in the entry, the entry in this field becomes the current entry. The checked bit in the current entry is marked 790, and the corresponding processor, processor core, or thread number is stored in the Path field. If there are no more matching entries in the processor, processor core, or thread number fields, the system returns to the previous entry in the back-track stack (e.g., the system returns to step 770).

Example Software Implementation for Speculative Throughput Computing

The process for speculative throughput computing can be implemented in software. For example, the access matrix table can be implemented as a data structure in virtual memory that can be accessed by regular read and write instructions. The speculative read and write instructions can be emulated using a sequence of regular computer instructions that access the data structure in virtual memory (e.g., global variables, and pointer structures).

FIG. 9 illustrates data structures 900 in virtual memory for an example software implementation of the process for speculative throughput computing. For example, FIG. 9 illustrates a matrix with rows that are pointed to by pointer variables. For each pointer variable (e.g., PTR1, PTR2, . . . PTRM; where M>0), a row can be allocated in the data structure 900 at the time a computer program (e.g., a computer program written in C programming language) is compiled. Each pointer can be associated with a number of elements equal to a number of program segments (e.g., P1, P2, . . . PN; where N>0). A "SUM" element can also be associated with each pointer.

Each element can include but is not limited to: a maximum data address (e.g., MAX entity), a minimum data address (e.g., MIN entity), and an indicator (e.g., W entity). The MAX entity can store a maximum data address accessed by a corresponding program segment. The MIN entity can store a minimum data address accessed by a corresponding program segment. The W entity can identify whether a location between the maximum data address and the minimum data address has been modified (e.g., accessed by a write instruction) by the corresponding program segment.

The software implementation can also generate a write log and write log pointer in virtual memory that is analogous to the write log 420 and write log pointer 430 of FIG. 4. The write log can be generated using, for example, global variables or a pointer structure.

Figure 10:
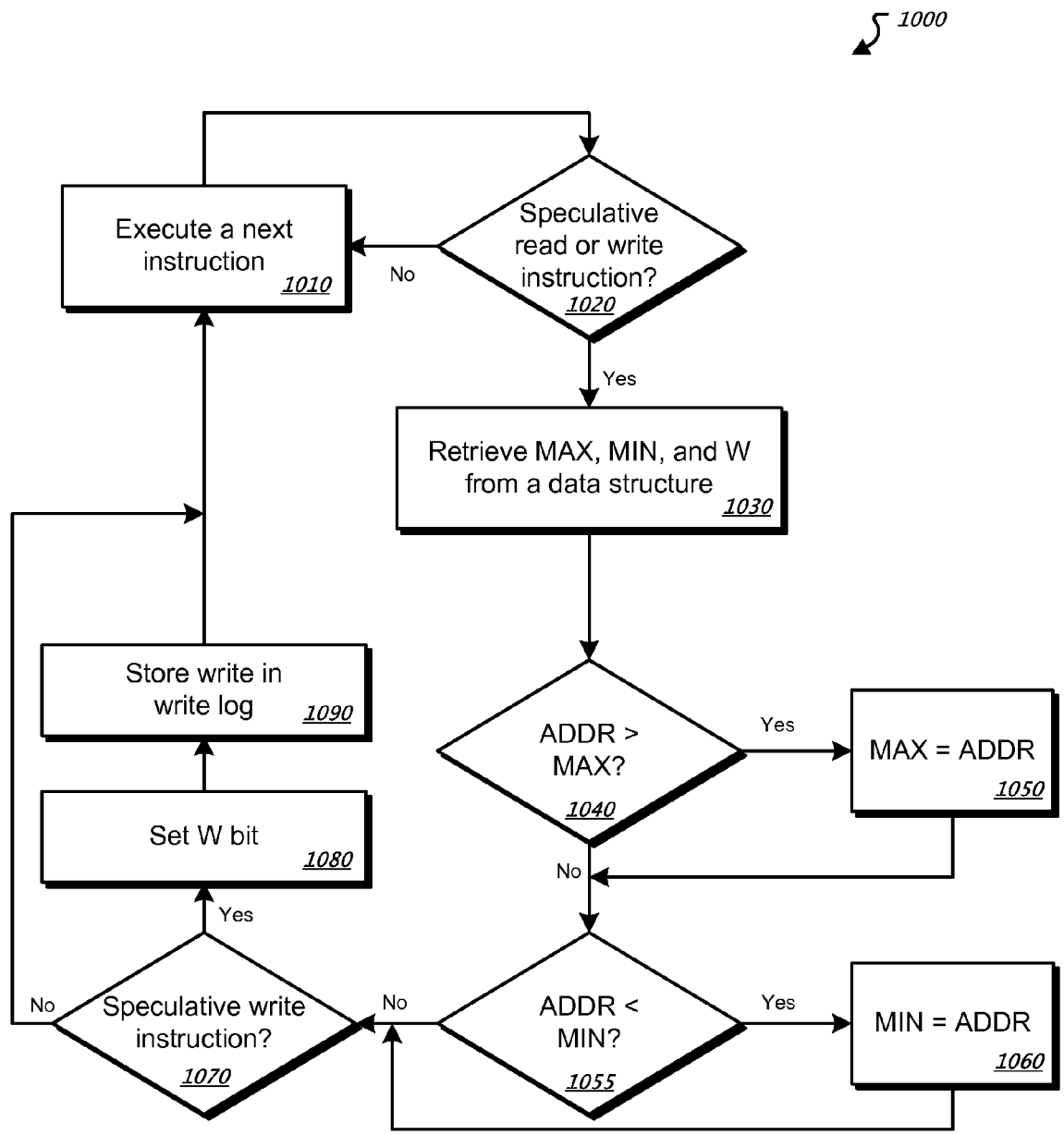
FIG. 10 shows an example process for generating the structures of FIG. 9.

FIG. 10 shows an example process 1000 for generating the structures of FIG. 9. For convenience, process 1000 will be described with respect to a system that performs the process 1000.

In a software implementation, a speculative read or write instruction can be emulated using regular read or write instructions (e.g., load or store instructions). For example, the speculative read or write instructions can be regular read or write instructions that are augmented with a sequence of ordinary instructions (e.g., checking code). The checking code can be used to determine 1020 if a read or write instruction is speculative. If the read or write instruction is not speculative ("No" branch of step 1020), then the read or write instruction is executed as usual (e.g., executed as a regular read or write instruction) and the system executes 1010 a next instruction.

If the read or write instruction is speculative ("Yes" branch of step 1020), then the system compares an effective address (e.g., ADDR of FIG. 10) of the speculative read or write instruction with a maximum data address and minimum data address. For example, the system retrieves 1030 MAX, MIN, and W entities from a data structure using the address for the pointer and the program segment number. If the effective address is greater than the maximum data address ("Yes" branch of step 1040), then the system stores 1050 the effective address as the maximum data address. Otherwise ("No" branch of step 1040), if the effective address is less than the minimum data address ("Yes" branch of step 1055), then the system stores 1060 the effective address as the minimum data address.

The system determines whether or not the speculative read or write instruction is a speculative write instruction. If the speculative read or write instruction is not a speculative write instruction ("No" branch of step 1070), then the system executes 1010 a next instruction. If the speculative read or write instruction is a speculative write instruction ("Yes" branch of step 1070), then the system sets 1080 an indicator (e.g., a "W" bit) to identify a speculative write instruction. In addition, the system stores 1090 the write, or the effective address and the data associated with the write instruction, in a write log (e.g., a write log analogous to write log 420, but implemented in virtual memory). In particular, the effective address and the data associated with the write log can be stored in a write log entry pointed to by a write log pointer, and the write log pointer is incremented to point to a next free write log entry. Then, the system returns to step 1010.

Figure 11:
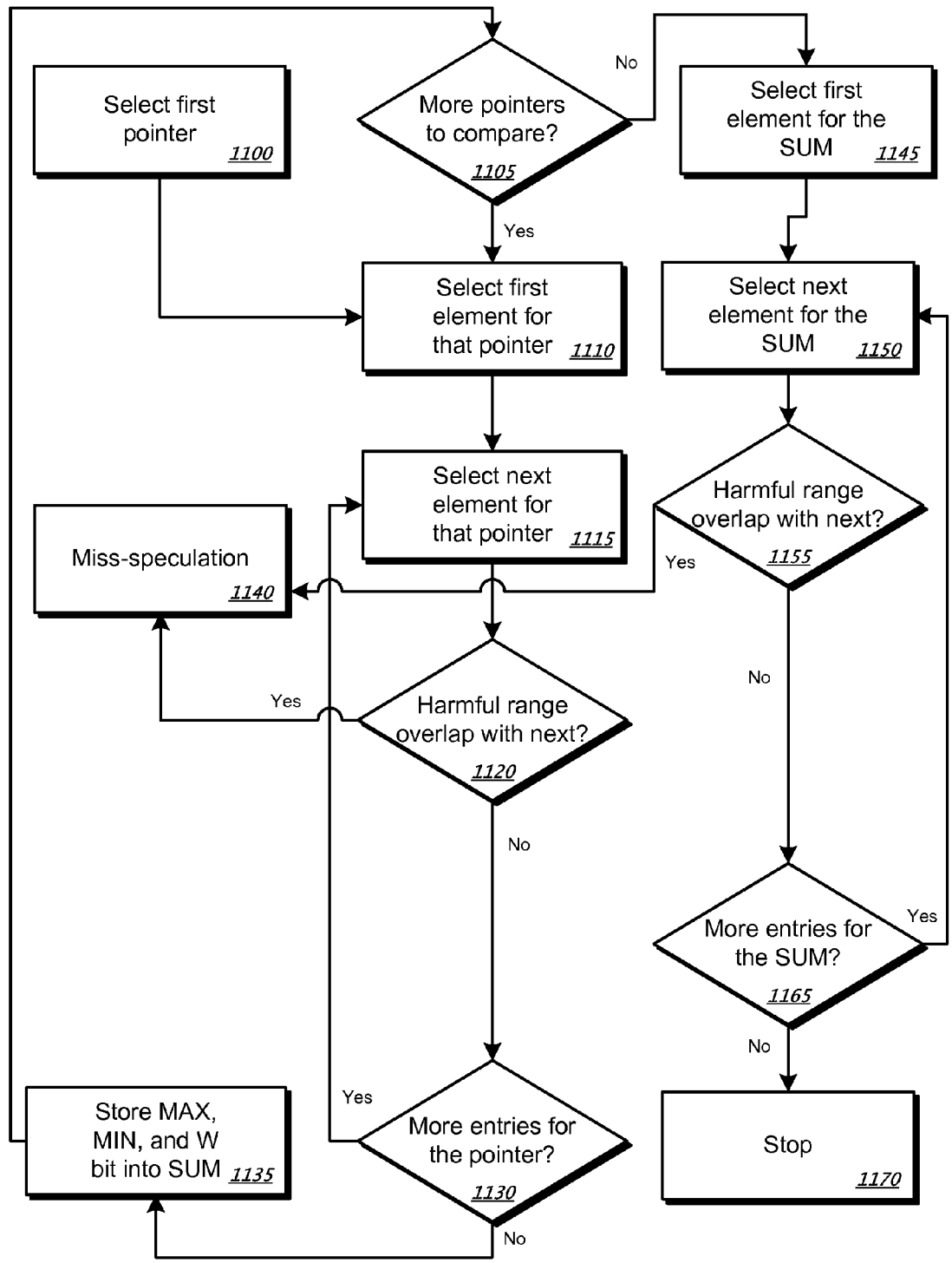
FIG. 11 shows an example process for a commit operation using the structures of FIG. 9.

Referring to FIG. 11, the system compares a first precise range of locations with a second precise range of locations to determine whether a range of locations accessed by a program overlaps with the ranges of locations accessed by other program segments. The system selects 1100 a first pointer (e.g., a first pointer row, pointed to by PTR1, in the matrix of FIG. 9). The system selects 1110 a first element for the first pointer, and retrieves the MAX, MIN, and W entities corresponding to the first element. The system then selects 1115 a next element for the first pointer, and retrieves the MAX, MIN, and W entities corresponding to the next element. If the first pointer or the next element do not exist, then the process terminates. The system compares the maximum data address (e.g., MAX entity) and the minimum data address (e.g., MIN entity) from the first element with the maximum data address (e.g. MAX entity) and minimum data address (e.g., MIN entity) from the next element.

The system determines if there is a harmful overlap. In particular, if the indicator in the first element is set, or the indicator in the next element is set; then a speculative write instruction has accessed the first precise range of locations corresponding to the first program segment, or the second precise range of locations corresponding to the second program segment, respectively. If the maximum data address from the first element is less than the maximum data address from the next element; and the maximum data address from the first element is greater than the minimum data address from the next element; then the first precise range of locations overlaps with the second precise range of locations. The system determines ("Yes" branch of step 1120) a harmful overlap, and the system identifies 1140 a miss-speculation. If the minimum data address from the first element is greater than the minimum data address from the next element; and the minimum data address from the first element is less than the maximum data address from the next element; then the first precise range of locations overlaps with the second precise range of locations. The system determines a harmful overlap ("Yes" branch of step 1120), and the system identifies 1140 a miss-speculation.

If the system does not determine a harmful overlap ("No" branch of step 1120), the system determines if there are more entries for the pointer. The system compares each element associated with a pointer with all of the other elements associated with the pointer, in this manner. For example, assume that a row of a current pointer includes elements A, B, and C. The system compares pairs A with B, A with C, and B with C. If there are more entries for the pointer ("Yes" branch of step 1130), then the system returns to step 1115.

If there are not more entries for the pointer ("No" branch of step 1130), then the system determines and stores 1135 the values (e.g., MAX entity, MIN entity, and W entity) in the SUM element for the row. In particular, the system determines the maximum of all the MAX entities (e.g., highest maximum data address) and the minimum of all the MIN entities (e.g., lowest minimum data address) in the row. For example, assume that a row includes elements A, B, and C. The determined maximum is the highest MAX value of A, B, and C; and the determined minimum will be the lowest MIN value of A, B, and C. The determined maximum and minimum values are stored in the MAX and MIN entities of the SUM element of the row.

The system computes the W entity as the logical OR operation of the W entities of all the elements in the row. For example, assume that a row includes elements A, B, and C.

The W entity of the SUM element is computed using the expression:

$$W(A) \text{ OR } W(B) \text{ OR } W(C), \text{ where}$$

W(x) represents the W entity of element x.

If there are more pointers to compare ("Yes" branch of step 1105), then the system returns to step 1110. If there are not more pointers to compare ("No" branch of step 1105), then the system compares the SUM elements. In particular, the system selects 1145 a first SUM element, and retrieves MAX, MIN, and W entities corresponding to the first SUM element. The system selects 1150 a next SUM element, and retrieves MAX, MIN, and W entities corresponding to the next SUM element. The system uses these entities to compare a first precise range of locations with a second precise range of locations to determine whether a range of locations accessed by a processor, processor core, or thread overlaps with the ranges of locations accessed by other processors, processor cores, or threads.

The system determines miss-speculations using a process (e.g., steps 1155 and 1165) analogous to the process described previously with reference to steps 1120 and 1130. If there are no more entries for SUM ("No" branch of step 1065), then the system stops. In particular, if the system does not identify a harmful overlap ("No" branch of step 1155), the system determines if the system has compared all SUM elements. If the system has compared all SUM elements ("Yes" branch of step 1165), the system stops 1170. Otherwise ("No" branch of step 1165), the system returns to step 1150. The SUM elements are compared in a manner analogous to the comparison of the row elements described previously.

If a miss-speculation is identified, the system restores the memory content of locations speculative write instructions have accessed in a manner analogous to that described above with reference to FIG. 7. In some implementations, the system uses, however, computer instructions instead of data structures in hardware. For example, pointer structures can be used to implement the data structures, write log, and write log pointer. The system uses the write log and a back-track stack to restore the memory content of locations speculative write instructions have accessed.

Reducing Miss-Speculations

The example hardware and software implementations of the process for speculative throughput computing, described previously, illustrated processes to identify miss-speculations. In some implementations, miss-speculations can also be reduced in the process for speculative throughput computing.

Figure 12:
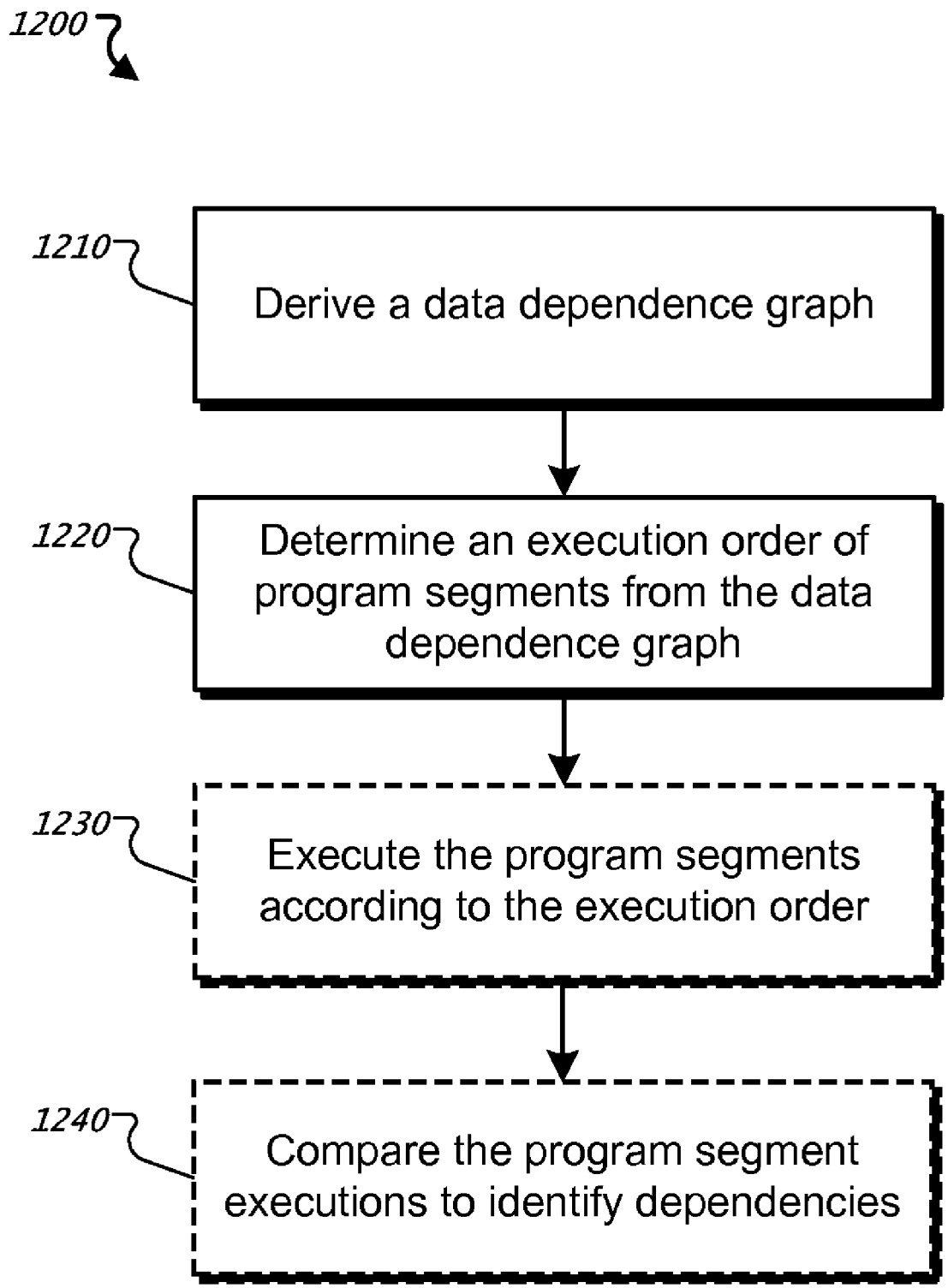
FIG. 12 shows an example process for a roll-back operation using the structures of FIG. 9 and a back-track stack.

FIG. 12 illustrates an example process 1200 for reducing miss-speculations. For convenience, process 1200 will be described with respect to a system that performs the process 1200. The system generates a schedule of program segments for a program to reduce a number of miss-speculations. In particular, the system derives 1210 a data dependence graph. The system determines 1220 an execution order of the program segments from the data dependence graph. The system executes 1230 the program segments according to the execution order. The system compares 1240 the program segment executions to identify dependencies.

Figure 13:
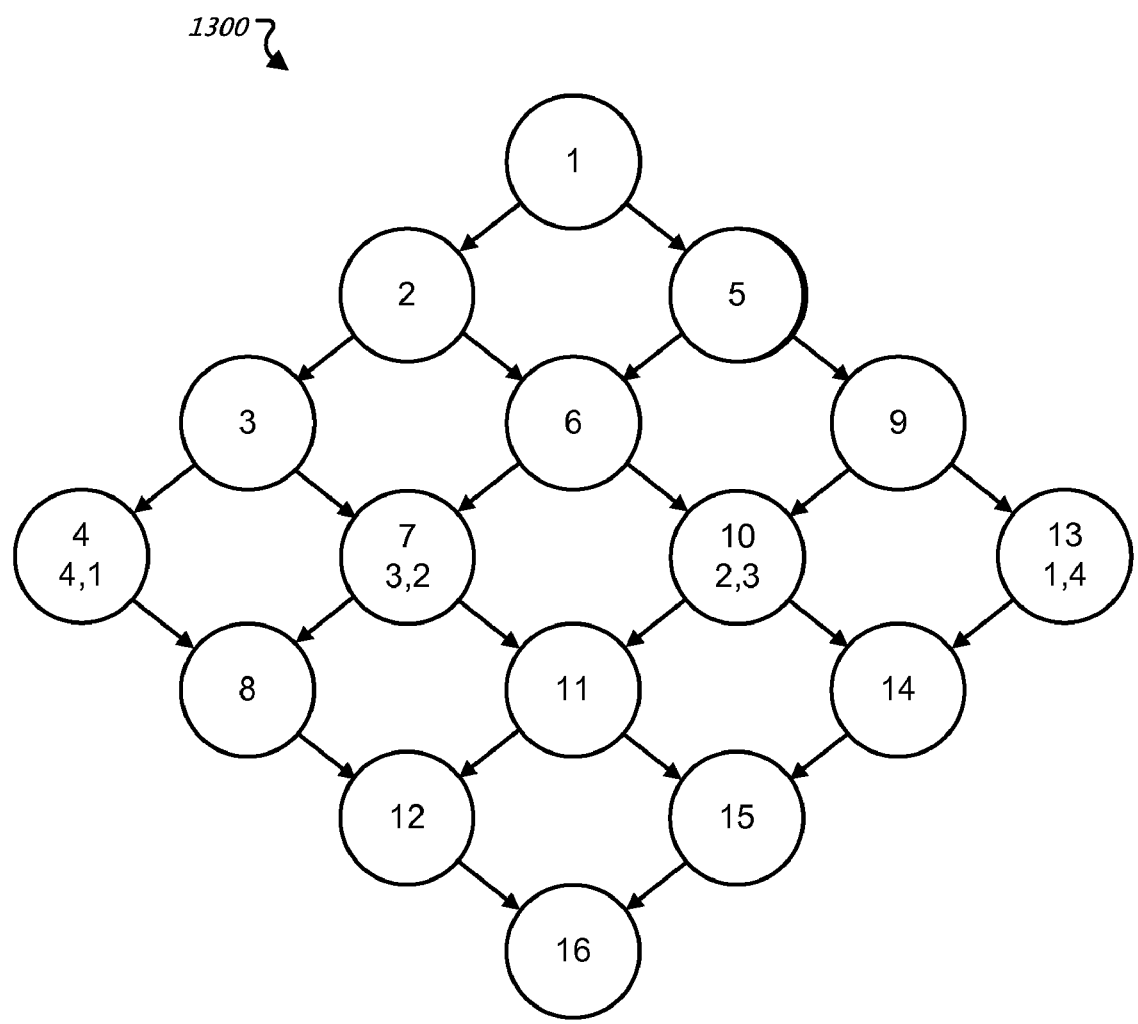
FIG. 13 illustrates an example data dependence graph.

FIG. 13 illustrates an example data dependence graph 1300. The data dependence graph can be derived from a computer program. For example, assume that a computer program includes the following code:

```
while condition do
    for i=1 to 4 do
        for j=1 to 4 do
            begin
                A[i,j] := A[i-1,j]+A[i+1,j]+A[i,j-1]+A[i,j+1];
            end;
```

In each iteration of the loop, a matrix element with index variables i and j (e.g., A[i,j]) is the sum of four neighbor matrix elements (e.g., A[i−1,j]+A[i+1,j]+A[i,j−1]+A[i,j+1]). If the iterations are enumerated in the order that they are executed (e.g., a first iteration is represented by state 1, and a second iteration by state 2), the resulting dependencies between iterations are derived, as illustrated in FIG. 13. For example, in the first enumeration (e.g., represented by state 1), i=1 and j=1, so A[1,1] is derived. As another example, in the second enumeration (e.g., represented by state 2), i=1 and j=2, so A[1,2] is derived. As a further example, in the fifth enumeration (e.g., represented by state 5), i=2 and j=1, so A[2,1] is derived. The fifth enumeration derives A[2,1]=A[1,1]+A[3,1]+A[2,0]+A[2,2]. The fifth enumeration does not depend on the second enumeration (A[1,2]), but the fifth enumeration depends on the first enumeration (A[1,1]). The arrows in the state graph illustrate the dependencies.

The program segments to be executed in parallel can be formed using each of the iterations. Because there are dependencies between almost all of the consecutive iterations (e.g., 4 depends from 3, 2, and 1), uncovering parallelism can be difficult. The data dependence graph allows a system to uncover parallelism, for example, in the loop. For example, program segments with enumeration order 4, 7, 10, and 13 can be executed in parallel.

In order to derive the data dependence graph, the system augments the program with trigger points that delimit program segments. In some implementations, the trigger points increment a variable that enumerates the enumeration order of the program segment. For example, the program loop (code illustrated above) can be augmented with a trigger point (e.g., "trigger;") as in the following example code:

```
while condition do
    for i=1 to 4 do
        for j=1 to 4 do
            begin
                trigger;
                A[i,j] := A[i-1,j]+A[i+1,j]+A[i,j-1]+A[i,j+1];
            end;
```

Each iteration in the program loop includes a call to the trigger point. The trigger point can increment a variable that enumerates the enumeration order of the program segment. The system also augments the program with markings of read and write instructions that potentially cause dependencies. The markings identify the instructions as speculative instructions.

If the program executes sequentially, a trap is generated each time a speculative read or write instruction is executed. A software routine (e.g., a trap handler) records the address and type (e.g., read or write) of speculative instruction in a file. The enumeration order of the program segment is also recorded in the file. Post-processing of the file is used to derive 1210 the data dependence graph, and the system determines 1220 an execution order of the program segments from the data dependence graph.

The system executes 1230 the program segments according to the execution order. In particular, the system can use a programming construct to execute program segments in parallel. For example, a construct "parallel_for (i,j)=(x1,y1; x2,y2; . . . ; xn,yn)" can be interpreted so that program segments with index variables (x1,y1), (x2,y2), . . . , and (xn,yn) execute speculatively in parallel. As a further example, an example program loop that uses the construct includes the code:

```
while condition do
    begin
        parallel_for (i,j) =(1,1)
            A[i,j] := A[i-1,j]+A[i+1,j]+A[i,j-1]+A[i,j+1];
        parallel_for (i,j) =(2,1;1,2)
            A[i,j] := A[i-1,j]+A[i+1,j]+A[i,j-1]+A[i,j+1];
        parallel_for (i,j) =(3,1;2,2;1,3)
            A[i,j] := A[i-1,j]+A[i+1,j]+A[i,j-1]+A[i,j+1];
        parallel_for (i,j) =(4,1;3,2;2,3;1,4)
            A[i,j] := A[i-1,j]+A[i+1,j]+A[i,j-1]+A[i,j+1];
        parallel_for (i,j) =(4,2;3,3;2,4)
            A[i,j] := A[i-1,j]+A[i+1,j]+A[i,j-1]+A[i,j+1];
        parallel_for (i,j) =(4,3;3,4)
            A[i,j] := A[i-1,j]+A[i+1,j]+A[i,j-1]+A[i,j+1];
        parallel_for (i,j) =(4,4)
            A[i,j] := A[i-1,j]+A[i+1,j]+A[i,j-1]+A[i,j+1];
        commit;
    end;
```

The program loop includes seven "parallel_for" constructs. The system uses the construct to execute 1230 the program segments according to the execution order. For example, the second "parallel_for" construct allows the system to execute a set of program segments (2,1) and (1,2) in parallel. Alternatively, consecutive "parallel_for" constructs are executed sequentially. For example, the third "parallel_for" construct allows the system to execute program segments (3,1), (2,2) and (1,3) in parallel, after the system executes program segments (2,1) and (1,2) in parallel.

The system compares 1240 the program segment executions to identify dependencies.

Determining whether or not a program segment in a later "parallel_for" construct with a higher enumeration order causes a dependency with a program segment in an earlier "parallel_for" construct with a lower enumeration order may be difficult. In some implementations, the system compares 1240 the program segment executions to identify dependencies, after all of the program segments have been executed (e.g., at a "commit" point in the program).

Program Translation and Speculative Execution

Returning to FIG. 2, the system analyzes 210 data dependence of program segments of a program, and the system profiles 220 the program. In particular, the system collects statistics for use in selecting a speculative method (e.g., a process for speculative throughput computing). In some implementations, the statistics include a number of instructions executed in program segment i ($N_i$), where i is an integer greater than zero; an average number of cycles used by an instruction ($CPI_i$); a number of speculative read instructions in program segment i ($R_i$); and a number of speculative write instructions in program segment i ($W_i$).

The system predicts a speedup gain from speculative execution. In particular, the system determines an execution time of a sequential execution of the program ($T_{sequential}$). The system derives the speedup gain by applying an analytical model. For example, the analytical model can include execution times represented by an equation:

$$T_{exec}(K) = \text{Max}[T_{segment\text{-}start}(K) + N_i \cdot CPI_i + R_i \cdot R_{cost}(K) + W_i \cdot W_{cost}(K) + P_{roll\text{-}back} \cdot \text{Roll-back}_{cost}(K) + (1 - P_{roll\text{-}back}) \cdot C_{cost}(K)], \text{ where:}$$

K identifies one of a plurality of speculative methods; Max is a maximum function; $T_{segment\text{-}start}$ models a start-up cost of initiating a speculative thread; $R_{cost}$ models a cost of a speculative read instruction; $W_{cost}$ models a cost of a speculative write instruction; $P_{roll\text{-}back}$ is a probability of a miss-speculation; Roll-back$_{cost}$ models a cost of a roll-back; and $C_{cost}$ models a cost of a commit.

The expression inside the maximum function (Max) is an estimated execution time for program segment i. The maximum function determines an execution time of a slowest program segment for a speculative method K. Therefore, the analytical model includes execution times of a plurality of speculative methods, and the execution times of the plurality of speculative methods equal the execution times of a slowest program segment. Applying $T_{exec}(K)$ from the analytical model, the system can predict a speedup gain using an equation:

$$\text{Speedup}(K) = T_{sequential}/T_{exec}(K).$$

The system then selects 230 one or more of a plurality of speculative methods (e.g., processes described with reference to FIGS. 3-13) to use for translation using the speedup gains for each speculative method. For example, the system selects the speculative method with the highest speedup gain. In some implementations, the system selects sequential execution if sequential execution has a lower execution time than the speculative methods (e.g., $T_{sequential} < T_{exec}(K)$, for all K).

In some implementations, the system selects a combination of speculative methods. For example, the system can use a combination of parts of one or more speculative methods of the plurality of speculative methods. As another example, the system can use a combination of one or more speculative methods of the plurality of speculative methods executed sequentially. As yet another example, the system can use a combination of one or more speculative methods of the plurality of speculative methods executed in parallel.

In some implementations, the process 200 can be included in a module that can be integrated with a compiler. In some implementations, a combination of one or more steps of process 200 (e.g., combinations of steps 210, 220, and 230) can be included in a module. In some implementations, the modules can be integrated with compilers. For example, a first compiler can include a module that can analyze data dependence of the program (e.g., step 210). A second compiler can include a module that can perform the other steps of process 200 (e.g., steps 220 and 230). In some implementations, an apparatus (e.g., multiprocessor computing system 100, multicore computing system, or multi-threaded computing system) can perform speculative execution (e.g., according to some or all of the processes described with reference to FIGS. 3-13). In some implementations, a system that includes the apparatus and the compiler can perform speculative execution (e.g., according to some or all of the methods described with reference to FIGS. 3-13).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   generating precise ranges of locations that speculative read or write instructions have accessed, where each precise range of locations is specified based on a first location accessed by a speculative read or write instruction and a second location accessed by a speculative read or write instruction;
   determining that a speculative write instruction from a first program segment has accessed a first precise range of locations;
   comparing the first precise range of locations with a second precise range of locations accessed by a speculative read or write instruction from a second program segment;
   determining that the first precise range of locations overlaps with the second precise range of locations; and
   identifying a miss-speculation and restoring memory content of locations speculative write instructions have accessed in the first precise range of locations and the second precise range of locations, when the first precise range of locations overlaps with the second precise range of locations.

2. The method of claim 1, where generating the precise ranges of locations that speculative read or write instructions have accessed comprises:
   extending one or more processors, processor cores, or threads including:
      generating data structures and write logs in hardware.

3. The method of claim 2, where the data structures are operable to store at least one of:
   a maximum data address, a minimum data address, and an indicator.

4. The method of claim 3, where the write log is operable to store data associated with a write instruction.

5. The method of claim 4, where the data associated with the write instruction includes an old value and a new value.

6. The method of claim 4, where the write log includes:
   a write log pointer operable to store an index of a next free write log entry.

7. The method of claim 6, where generating the precise ranges of locations that speculative read or write instructions have accessed further comprises:
   determining if a read or write instruction is speculative; and
   if the read or write instruction is speculative, executing the speculative read or write instruction, including:
      in the data structure for a corresponding processor, processor core, or thread,
         locating the speculative read or write instruction including:
            if the execution of the speculative read or write instruction is a first execution of the speculative read or write instruction, storing the speculative read or write instruction;
         comparing an effective address of the speculative read or write instruction with the maximum data address and the minimum data address;
         if the effective address is greater than the maximum data address,
            storing the effective address as the maximum data address; and
         if the effective address is less than the minimum data address,
            storing the effective address as the minimum data address.

8. The method of claim 7, where executing the speculative read or write instruction farther includes:
   if the speculative read or write instruction is a speculative write instruction,
      setting the indicator to identify a speculative write instruction, and
      storing the effective address and the data associated with the write instruction in the write log.

9. The method of claim 8, where storing the effective address and the data associated with the write instruction in the write log includes:

using the write log pointer to determine a write log entry for storage; and incrementing the write log pointer to the next free write log entry.

10. The method of claim 3, where comparing the first precise range of locations with the second precise range of locations comprises:

retrieving the maximum data address and the minimum data address in the data structure for a first processor, processor core, or thread;

retrieving the maximum data address and the minimum data address in the data structure for a second processor, processor core, or thread; and comparing the maximum data address and the minimum data address from the first processor, processor core, or thread with the maximum data address and minimum data address from the second processor, processor core, or thread.

11. The method of claim 3, where the speculative write instruction has accessed the first precise range of locations, if the indicator in the data structure for a first processor, processor core, or thread corresponding to the first program segment is set.

12. The method of claim 5, where restoring the memory content of the locations that speculative write instructions have accessed comprises:

determining a processor, processor core, or thread that wrote a final value to a location including:

storing a value of the location and an address of the location; and if a current address is contained in the write log entry, a new value corresponding to the current address is equal to the value of the location, and the new value is not equal to a corresponding old value, determining a matching entry, and storing the matching entry in a back-track stack.

13. The method of claim 12, where restoring the memory content of the locations that speculative write instructions have accessed further comprises:

using the data structure and the back-track stack to restore the old values in the locations.

14. The method of claim 1, where generating the precise ranges of locations that speculative read or write instructions have accessed comprises:

generating a data structure and a write log in virtual memory.

15. The method of claim 14, where the data structure is operable to store at least one of:

a maximum data address, a minimum data address, and an indicator.

16. The method of claim 15, where the write log is operable to store data associated with a write instruction.

17. The method of claim 16, where the data associated with the write instruction includes an old value and a new value.

18. The method of claim 16, where the write log includes:

a write log pointer operable to store an index of a next free write log entry.

19. The method of claim 18, where generating the ranges of locations that speculative read or write instructions have accessed further comprises:

determining if a read or write instruction is speculative; and if the read or write instruction is speculative, executing an augmented read or write instruction, including:

retrieving maximum data addresses, minimum data addresses, and indicators from the data structure;

comparing an effective address of the read or write instruction with the maximum data addresses and minimum data addresses;

if the effective address is greater than the maximum data address, storing the effective address as the maximum data address; and if the effective address is less than minimum data address, storing the effective address as the minimum data address.

20. The method of claim 19, where executing the augmented speculative read or write instruction further includes:

if the read or write instruction is a speculative write instruction, setting the indicator to identify that a location between the maximum data address and the minimum data address has been modified by a speculative write instruction, and storing the effective address and the data associated with the write instruction in the write log.

21. The method of claim 20, where storing the effective address and the data associated with the write instruction in the write log includes:

using the write log pointer to determine a write log entry for storage; and incrementing the write log pointer to the next free write log entry.

22. The method of claim 15, where comparing the first precise range of locations with the second precise range of locations comprises:

retrieving the maximum data address and the minimum data address in the data structure for a corresponding first processor, processor core, or thread; and comparing the maximum data address and the minimum data address with maximum data addresses and minimum data addresses in the data structure for a corresponding second processor, processor core, or thread.

23. The method of claim 15, where the speculative write instruction from a first program segment has accessed the first precise range of locations, if the indicator in the data structure for the first program segment is set.

24. The method of claim 17, where restoring the memory content of locations speculative write instructions have accessed comprises:

determining a processor, processor core, or thread that wrote a final value to a location including:

storing a value of the location and an address of the location; and if a current address is contained in the write log entry, a new value corresponding to the current address is equal to the value of the location, and the new value is not equal to a corresponding old value, determining a matching entry, and storing the matching entry in a back-track stack.

25. The method of claim 24, where restoring the memory content of locations speculative write instructions have accessed further comprises:

using the data structure and the back-track stack to restore the old values in the locations.

26. A computer program product, encoded on a computer-readable medium, operable to cause a data processing apparatus to:

generate precise ranges of locations that speculative read or write instructions have accessed, where each precise range of locations is specified based on a first location accessed by a speculative read or write instruction and a second location accessed by a speculative read or write instruction;

determine that a speculative write instruction from a first program segment has accessed a first precise range of locations;

compare the first precise range of locations with a second precise range of locations accessed by a speculative read or write instruction from a second program segment;

determine that the first precise range of locations overlaps with the second precise range of locations; and identify a miss-speculation and restore memory content of locations speculative write instructions have accessed in the first precise range of locations and the second precise range of locations, when the first precise range of locations overlaps with the second precise range of locations.

27. The computer program product of claim 26, where generating the precise ranges of locations that speculative read or write instructions have accessed comprises:

extending one or more processors, processor cores, or threads including:

generating data structures and write logs in hardware.

28. The computer program product of claim 26, where generating the precise ranges of locations that speculative read or write instructions have accessed comprises:

generating a data structure and a write log in virtual memory.

29. A system comprising:

one or more processors or processor cores;

a computer-readable medium coupled to the one or more processors or processor cores and having instructions contained thereon, which, when executed by the one or more processors or processor cores, causes the one or more processors or processor cores to perform the operations of:

generating precise ranges of locations that speculative read or write instructions have accessed, where each precise range of locations is specified based on a first location accessed by a speculative read or write instruction and a second location accessed by a speculative read or write instruction;

determining that a speculative write instruction from a first program segment has accessed a first precise range of locations;

comparing the first precise range of locations with a second precise range of locations accessed by a speculative read or write instruction from a second program segment;

determining that the first precise range of locations overlaps with the second precise range of locations; and identifying a miss-speculation and restoring memory content of locations speculative write instructions have accessed in the first precise range of locations and the second precise range of locations, when the first precise range of locations overlaps with the second precise range of locations.

30. The system of claim 29, where generating the precise ranges of locations that speculative read or write instructions have accessed comprises:

extending one or more processors, processor cores, or threads including:

generating data structures and write logs in hardware.

31. The system of claim 29, where generating the precise ranges of locations that speculative read or write instructions have accessed comprises:

generating a data structure and a write log in virtual memory.

* * * * *

UNITED STATES PATENT AND TRADEMARK OFFICE
CERTIFICATE OF CORRECTION

PATENT NO. : 7,681,015 B2  Page 1 of 1
APPLICATION NO. : 12/022713
DATED : March 16, 2010
INVENTOR(S) : Alexander Busck et al.

It is certified that error appears in the above-identified patent and that said Letters Patent is hereby corrected as shown below:

Column 18, Line 58 at Claim 8; replace:
"read or write instruction farther includes:" with
-- read or write instruction further includes: --

Signed and Sealed this

First Day of June, 2010

David J. Kappos
*Director of the United States Patent and Trademark Office*